United States Patent [19]

King, Sr.

[11] 4,331,174

[45] * May 25, 1982

[54] INLINE DISPERSAL VALVE

[75] Inventor: Lloyd H. King, Sr., Hopkins, Minn.

[73] Assignee: Durance, Inc., Excelsior, Minn.

[*] Notice: The portion of the term of this patent subsequent to Feb. 10, 1998, has been disclaimed.

[21] Appl. No.: 144,765

[22] Filed: Apr. 28, 1980

Related U.S. Application Data

[63] Continuation-in-part of Ser. No. 958,167, Nov. 6, 1978, Pat. No. 4,249,562.

[51] Int. Cl.³ .............................................. B01F 1/00
[52] U.S. Cl. ................................... 137/268; 422/263; 422/277
[58] Field of Search ................ 137/268; 422/263, 264, 422/266, 275, 276, 281, 282, 277; 239/310, 315, 317; 251/145, 146

[56] References Cited

U.S. PATENT DOCUMENTS

| | | | |
|---|---|---|---|
| 2,455,240 | 11/1948 | Dupler | 422/264 B X |
| 3,550,625 | 12/1970 | Adams | 251/145 X |
| 3,724,810 | 4/1973 | Andersson | 251/145 |
| 3,846,078 | 11/1974 | Brett | 422/264 B |

Primary Examiner—Alan Cohan
Attorney, Agent, or Firm—Jacobson and Johnson

[57] ABSTRACT

An apparatus for controllably dispersing material into a fluid stream with the apparatus having a housing with a bottom section that attaches to a pipe line and a top section having a cylindrical sleeve with a porous container therein to support a solid fluid soluble material. The porous container can be controllably inserted into a fluid stream through coaction of a spring and cap to control the amount of soluble material entering the fluid stream. A sealing surface on the porous container and the cylindrical sleeve prevents fluid from escaping from the line when the porous container is in the up position and an upper seal prevents leakage past the cap when the valve is in operation.

6 Claims, 5 Drawing Figures

INLINE DISPERSAL VALVE

CROSS REFERENCE TO RELATED INVENTIONS

This application is a continuation-in-part of my co-pending application titled INLINE DISPERSAL VALVE, U.S. Ser. No. 958,167, filed Nov. 6, 1978 now U.S. Pat. No. 4,249,562 issued Feb. 10, 1981.

BACKGROUND OF THE INVENTION

1. Field of the Invention

This invention relates generally to attachments for fluid pipe lines and, more specifically, to attachments for controllably dispersing fluid soluble materials into a fluid stream.

2. Description of the Prior Art

The concept of dissolving solid material and controllably releasing the material into a fluid stream such as with the bromination of swimming pools is accomplished by suspending a fluid soluble solid in the fluid stream. The present invention provides an improvement to prior art systems to allow a user to control the amount of material dispersed into the fluid stream.

SUMMARY OF THE INVENTION

Briefly, the present invention comprises an inline dispersal valve having a cylindrical sleeve encasing a porous container for holding a solid. A cylindrical sleeve fastens to the inline dispersal valve to provide a guide so that the porous container can be controllably lowered into the fluid stream. The porous container has a sealing surface and the cylindrical sleeve has a sealing surface to seal the porous container from the fluid stream when the solid is inserted into the porous container. A first remotely placed sealing means on the housing prevents leakage of fluid from the inline dispersal valve when the valve is in operation and a second remotely placed sealing means prevents leakage of fluid between the cylindrical sleeve and the housing.

DESCRIPTION OF THE PREFERRED EMBODIMENT

Figure 1:
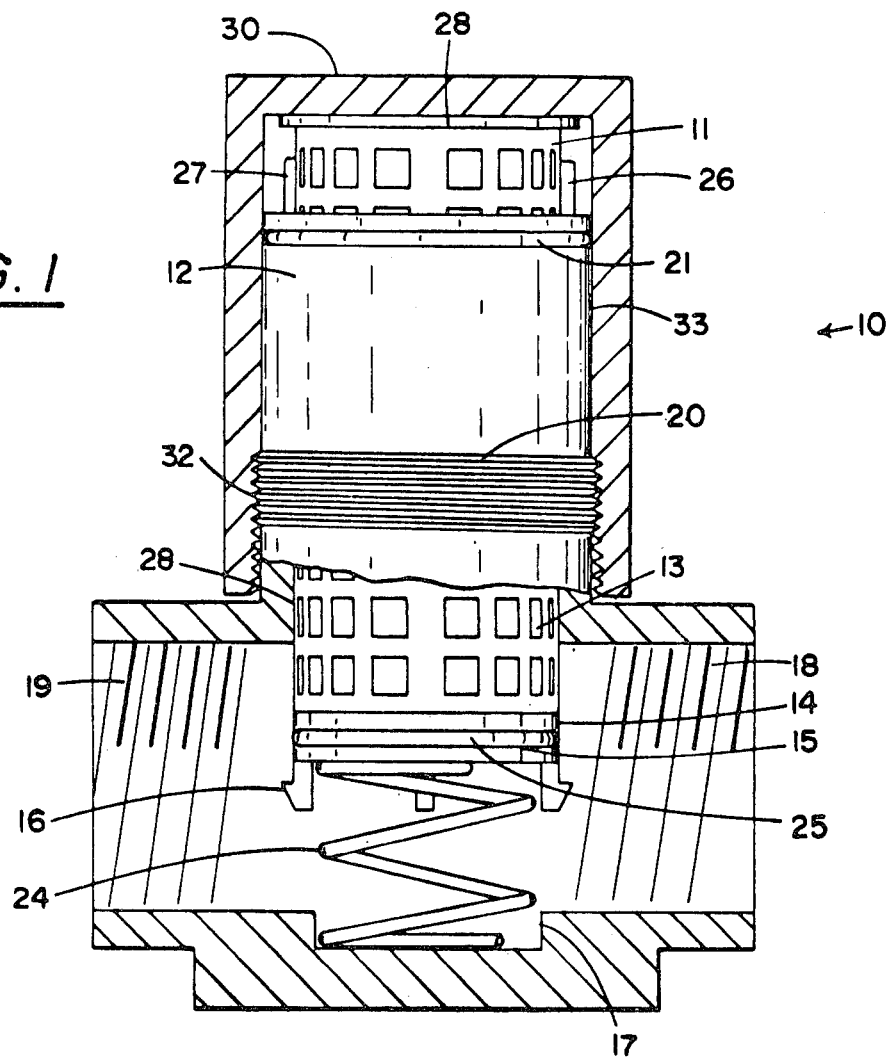
FIG. 1 is a partial sectional view of an inline dispersal valve without a cylindrical sleeve.

Referring to FIG. 1, reference numeral 10 generally designates one embodiment of my inline solid dispersal valve comprising a T-shaped housing 12, a porous container 11, and a cap 30. Housing 12 has a threaded insert 18 located on one end and a threaded insert 19 located on the other end for attachment of housing 12 to a fluid line. Slideably mounted within a cylindrical opening in housing 12 is a cylindrical porous container 11. Container 11 has a series of openings 13 therein which allow fluid to flow therethrough. The lower portion of container 11 contains a solid bottom 14 having a groove 15 with an O-ring 25 therein.

Attached to the underside of container 12 are a set of one way catches 16 for retaining container 11 in housing 12 when cap 30 is removed. Located partially in recess 17 is a compression spring 24 that extends into pressure contact with the bottom of container 11. Spring 24 provides an upward force on container 11 causing the container top 28 to be held in pressure contact with the top inside surface of cap 30. Unscrewing cap 30 allows spring 24 to force container 11 upward. If cap 30 is unscrewed completely, container 11 rises until catches 16 engage the inside of housing 10 thereby preventing spring 24 or the fluid pressure from forcing container 11 out of housing 12. This position is defined as the up condition. Spring 24 insures that container 11 always returns to the up condition when cap 30 is removed thereby preventing injury to anyone removing cap 30 when the fluid line is under pressure. With container 11 in the up condition, O-ring 25 seats against the interior cylindrical sealing surface 28 in housing 11 thereby preventing fluid from the line entering container 11 when the cap 30 is removed. Sealing the fluid line from container 11 eliminates the necessity of the user shutting off the pressure in the fluid line when cap 30 is removed. With cap 30 removed, the user can insert a new solid into container 11. Thus an advantage of the present invention is the ease in which a solid can be added to container as well as eliminating the need to shut off the fluid line when solids are added to container 11.

After insertion of the solid material in container 11, the user screws the threads 32 on cap 30 onto the threads 20 on housing 10. Besides thread section 20 the interior of cap 30 has a smooth cylindrical surface 33 located above the threaded section 20 which forms a sealing surface for engagement with O-ring 21.

Screwing cap 30 onto housing 10 forces container 11 downward into the fluid stream. To prevent rotation of container 11 during rotation of cap 30, a pair of guides 26 and 27 located on basket 11 slideably follow a vertical groove located in the interior of housing 10. As container 11 is lowered fluid enters the lower openings in container 11. To prevent fluid in container 13 from leaking past the cap, O-ring seal 21 on housing 11 coacts with smooth cylindrical surface 33 to prevent leakage between cap 30 and housing 10.

Figure 2:
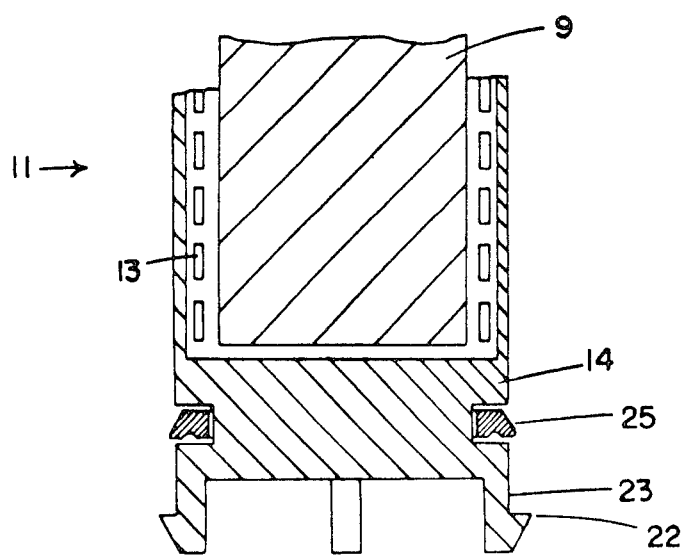
FIG. 2 is an enlarged view of the sealing means on the bottom of the porous container of my inline dispersal valve without a cylindrical sleeve.

Referring to FIG. 2, there is shown an enlarged sectioned view of container 11 with the bottom container 11 having a solid material 9 located therein. In operation fluid flows through openings 13 and around the solid thereby slowly dissolving and dispersing the solid material into the fluid stream.

One can control the amount of fluid flowing through container 11 by lowering or raising container 11. Lowering or raising container 11 controls the concentration of solid material dissolved and dispersed in the fluid stream, i.e., the more fluid flowing through container 11, the greater concentration of dissolved solid in the stream.

Instead of an O-ring seal, container 11 has a one way seal 25 which has an outward projecting lip to thereby prevent fluid from seeping past the basket when the basket is in the up condition. Tabs or catches 16 are shown in more detail to comprise a lip 22 attached to a semiflexible neck 25. The lip 22 has a slanted face for ease of insertion in housing 10. Flexible neck 23 allows the catches to bend inward during the assembly process. After assembly, lips 22 engage the inside of housing 10 to prevent container 11 from being forced out of container 11.

Another feature of the present invention is that spring 24 allows container 11 to slide downward into the fluid stream should the gas pressure in the cap 30 and container 11 exceed a certain value. For example, if one places chlorine in container 11 and places cap 30 on the housing without turning cap 30 down sufficiently far to lower container 11 into the fluid stream, the gas generated by the chlorine could increase causing rupture of the cap 30 if container 11 were locked in position. However, spring 24 allows container 11 to slide downward allowing gas to enter the fluid stream even though cap 30 is not down sufficiently far as to displace container 11 into the fluid stream.

In operation, thread 32 and thread 20 engage before top 28 of container 11 engages the inside of cap 30. Thus insuring that no fluid will escape through container 11 during installation of cap 30.

Preferrably, valve 10 is made from a polymer plastic; however, metals are also suitable for use in manufacture of my valve.

Figure 3:
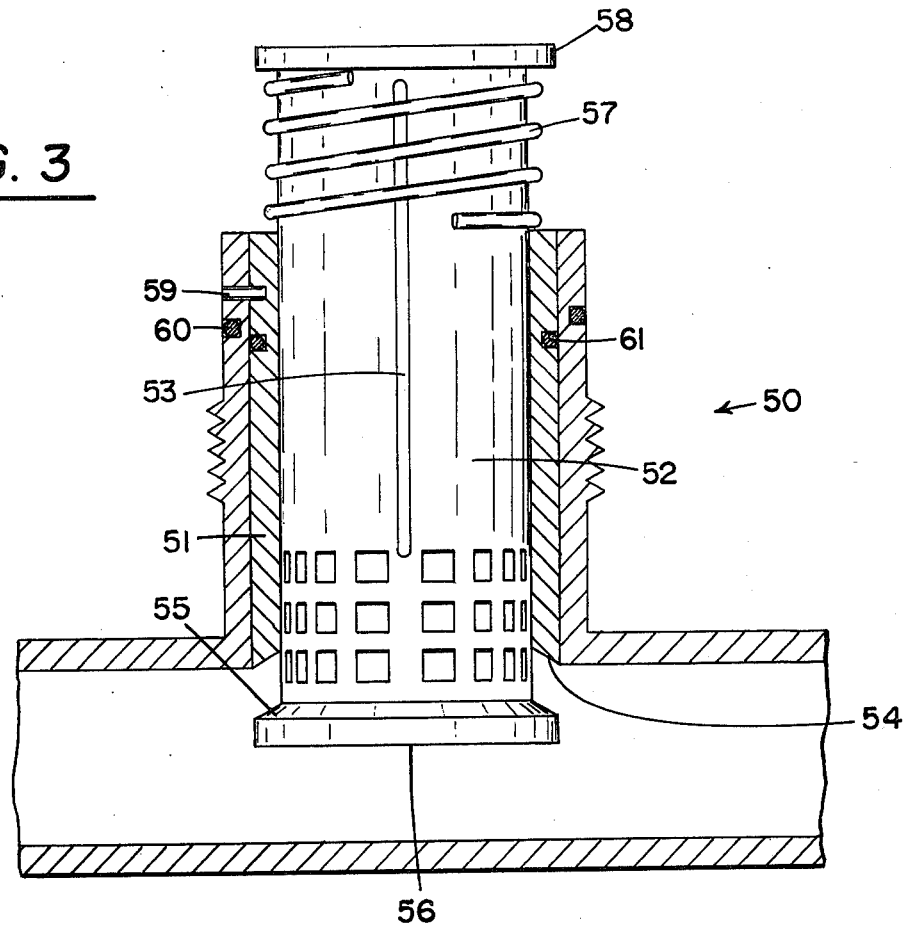
FIG. 3 is a cross sectional view of the inline dispersal valve having a cylindrical sleeve.
Figure 4:
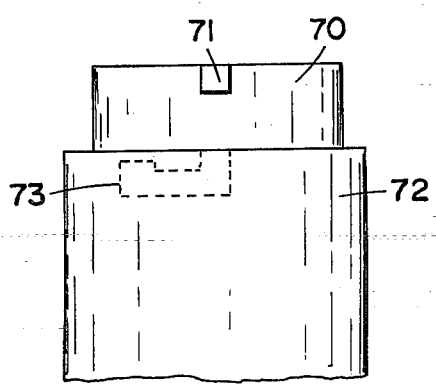
FIG. 4 is a side view showing the mechanism for attaching the cylindrical sleeve to a housing.
Figure 5:
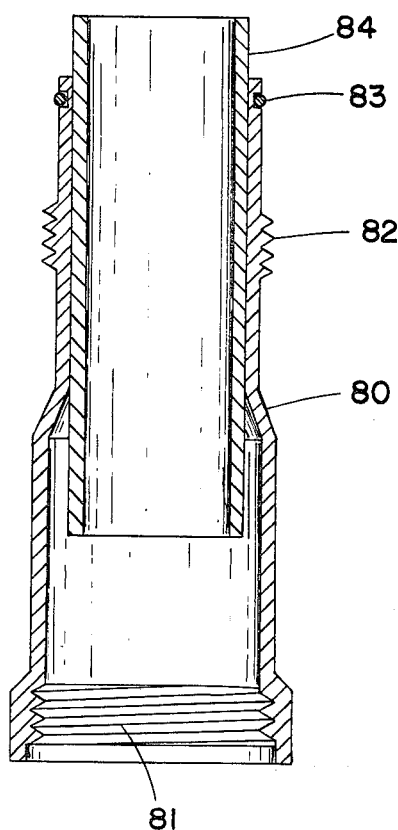
FIG. 5 shows another modification of the device.

The embodiment shown in FIG. 3 is an improvement that eliminates the necessity of having a spring or latches located within the main flow area of the line as well as certain sealing members. In the invention of FIGS. 1 and 2, seal 25, which is typically rubber or the like, is located continually in contact with the chemicals that may be in the line thereby resulting in a relatively short seal life. The embodiment of FIG. 3 eliminates the necessity of having an inline seal of rubber or the like thereby greatly decreasing the maintenance periods for valve 50.

Referring to FIG. 3, reference numeral 50 identifies my inline dispersal valve employing a cylindrical sleeve 51. Cylindrical sleeve 51 is located within a cylindrical housing with a sealing member such as O-ring 61 located in an annular recess in sleeve 51. O-ring seal 61 prevents leakage of fluid between the inner mating cylindrical surface of housing 50 and the outer mating cylindrical surface of sleeve 51. Note, O-ring 61 is remotely located from the fluid paths within valve 50. Typically, cylindrical sleeve is closely dimensioned to the interior dimensions of the cylindrical opening in the housing so that cylindrical sleeve 51 fits snugly within the confines of the cylindrical opening housing 50. Valve 50 is similar to valve 10 in that a cap (not shown) is used to raise and lower container 52 in valve 50. Similarly, to prevent leakage past a cap there is provided an O-ring seal 60 in the upper housing of valve 50.

Porous container 52 is similar to porous container 11; however, the resilient means for producing an upward force on container 52 comprises a coil spring 57 that engages the top of cylindrical sleeve 51 and the bottom of top lip 58 of container 52. For purposes of illustrating the operation of container 52, coil spring 57 is shown in a partially compressed condition, i.e., normally, without a cap on housing 50 the resilient force of compression spring 57 maintains container 52 in an upward sealing position with the bottom of container 52 located in contact with the bottom of sleeve 51. Located on side of porous container 52 is a ridge 53 that fits in a longitudinal recess in sleeve 50 to prevent rotation of container 52 therein. Located on the bottom of container 52 is a beveled surface 55 which is mated with a beveled surface 54 located on the underside of cylindrical sleeve 52. The mating surface 54 and 55 have sufficiently close tolerances so that when two surfaces are in contact with each other it produces a fluid sealing action therebetween. Normally, with removal of the cap from valve 50 the coil spring 57 forces surface 54 and 55 into sealing contact with each other. The sealing action between sleeve 51 and container 50 permits the operator to remove the cap (not shown) without fear of fluid escaping through the porous container. In operation, fluid flows through container 52 and through the main opening in valve 50. Typically, the rigid polymer plastics are suitable for use as a sleeve or a porous container.

The embodiment of FIG. 3 minimizes the obstruction of the fluid stream by eliminating the need for a spring and restraining mechanism in the fluid line. In addition, no O-ring seals or the like are required in the regions where the fluids flow.

In order to hold cylindrical sleeve in position within container 52 in housing 50 one can pin cylindrical sleeve to valve 50 through a pin 59. FIG. 4 shows an alternate embodiment having an ear 71 on a container 70 that projects outward to engage a recess 73 located in housing 72. In both embodiments, the sleeve is prevented from upward motion in housing 50.

Referring to FIG. 5, reference numeral 80 designates a cylindrical extension for connecting between inline dispersal valve 10 and inline dispersal cap 30. The purpose of extension 80 is to provide more vertical storage capacity for materials which are dispersed into the fluid line. Extension 80 has a sufficiently large diameter and a set of interior threads 81 to enable it to engage threads 20 on the exterior of my inline dispersal valve, i.e., similar to engaging of threads 32 of cap 30 with threads 20 as shown in FIG. 1. To understand the operation of my cylindrical extension 80, reference should be made to the embodiment of FIG. 1.

The sealing action between inline dispersal valve 10 and extension 80 is produced in the same manner as cap 30 seals to inline dispersal valve 10 through seal 21. Note, the top portion of extension 80 has a reduced diameter to fit inside cap 30 so that the same cap can be used. The top reduced diameter portion contains a series of female threads which can engage threads 20 of cap 30 and rim seal 83 provides for sealing between cap 30 and extension 80. The purpose of extension 80 is to provide a larger storage capacity for soluble materials which are placed in the inline dispersal valve without adversely affecting the operation of the inline dispersal valve.

In order to provide the extra storage capacity and have container 11 and cap 30 coact and function as shown in FIG. 1, there is provided a cylindrical sleeve 84 of substantially the same diameter as container 10. Sleeve 84 is slidable within the confines of extension 80. In operation the top portion of sleeve 84 engages the underside of cap 30 similar to the engagement of the top of container 11 with the underside of cap 30. Similarly, the bottom portion of sleeve 84 engages the top of container 10 thus turning cap 30 on extension 80 permitting one to move container 11 up and down in response to upward and downward motion of cap 30. Thus, extension 80 provides upward and downward motion of container 11 without adversely affecting the operation of container 11 in inline dispersal valve 10.

I claim:

1. An inline dispersal valve for controllably releasing material into a fluid line comprising:

a housing having a means for attachment to a pressurized fluid line, said housing having an opening therein operable for fluid coupling with fluid in a fluid line;

a sleeve located in said housing said sleeve having an opening therein;

a porous container slideably mounted in the opening in said sleeve;

means for controllably raising or lowering said container into the pressurized fluid line to allow fluid to flow through said container to thereby dissolve soluble solid in said container and transport said dissolved material into the fluid line; and resilient means for maintaining said container in contact with said means for controllably raising or lowering said container.

2. The invention of claim 1 including coacting sealing surfaces located in said sleeve and said container to thereby prevent fluid from flowing into said container when said container is in the up position.

3. The invention of claim 2 wherein said sleeve includes means for holding said sleeve in said housing.

4. The invention of claim 3 wherein said container includes means to prevent rotation of said container during rotation of a cap onto said container.

5. The invention of claim 4 wherein said container has a recess therein for placing a solid material therein.

6. The invention of claim 5 wherein said inline dispersal valve includes an extension for increasing the holding capacity of said container.

* * * * *